(12) United States Patent
Jungaberle et al.

(10) Patent No.: US 11,254,299 B2
(45) Date of Patent: Feb. 22, 2022

(54) METHOD AND CONTROL UNIT FOR OPERATING A MOTOR VEHICLE DRIVE TRAIN

(71) Applicant: ZF Friedrichshafen AG, Friedrichshafen (DE)

(72) Inventors: Alexander Jungaberle, Schlier (DE); Falko Platzer, Friedrichshafen (DE); Werner Wolfgang, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 133 days.

(21) Appl. No.: 16/787,230

(22) Filed: Feb. 11, 2020

(65) Prior Publication Data
US 2020/0254991 A1   Aug. 13, 2020

(30) Foreign Application Priority Data
Feb. 12, 2019 (DE) .................... 10 2019 201 790.8

(51) Int. Cl.
*B60W 20/00* (2016.01)
*B60K 6/36* (2007.10)
(Continued)

(52) U.S. Cl.
CPC .............. *B60W 20/00* (2013.01); *B60K 6/26* (2013.01); *B60K 6/36* (2013.01); *B60K 6/38* (2013.01);
(Continued)

(58) Field of Classification Search
CPC ...... B60W 20/00; B60W 10/02; B60W 10/08; B60W 2710/083; B60W 2710/021;
(Continued)

(56) References Cited

U.S. PATENT DOCUMENTS

| 7,360,616 | B2 | 4/2008 | Schiele | |
|---|---|---|---|---|
| 8,326,475 | B2* | 12/2012 | Yoshida | B60W 30/192 |
| | | | | 701/22 |
| 8,465,393 | B2 | 6/2013 | Lemp et al. | |
| 2005/0155803 | A1* | 7/2005 | Schiele | B60W 10/08 |
| | | | | 180/65.25 |

(Continued)

FOREIGN PATENT DOCUMENTS

| DE | 102004002061 A1 | 8/2005 |
|---|---|---|
| DE | 102010061826 A1 | 5/2012 |

OTHER PUBLICATIONS

German Search Report DE102019201790.8 dated Nov. 28, 2019. (16 pages).

*Primary Examiner* — David J Hlavka
(74) *Attorney, Agent, or Firm* — Dority & Manning, P.A.

(57) ABSTRACT

A method for operating a drive train of a motor vehicle may include, for a starting process of an internal combustion engine, transferring the separating clutch from a disengaged condition into an engaged condition or a slip state such that the electric machine accelerates the internal combustion engine to a starting speed. The method may further include actuating a torque-transmitting element between the electric machine and the output shaft to enter a slip state. The method may also include increasing the torque of the electric machine to reliably reach and hold the slip state of the torque-transmitting element. Additionally, the method may include operating the electric machine as a generator or as a motor depending on an expected load direction of the drive train during the starting process to reliably reach and hold the torque-transmitting element in the slip state.

14 Claims, 4 Drawing Sheets

(51) Int. Cl.
*B60K 6/38* (2007.10)
*B60W 10/02* (2006.01)
*B60K 6/26* (2007.10)
*B60W 10/08* (2006.01)

(52) U.S. Cl.
CPC ............ *B60W 10/02* (2013.01); *B60W 10/08* (2013.01); *B60W 2540/10* (2013.01); *B60W 2710/021* (2013.01); *B60W 2710/083* (2013.01); *B60Y 2200/92* (2013.01)

(58) Field of Classification Search
CPC ..... B60W 2540/10; B60W 2510/1025; B60W 2710/025; B60W 10/026; B60W 10/06; B60W 20/40; B60W 10/11; B60W 2710/0666; B60W 2510/0638; B60K 6/36; B60K 6/38; B60K 6/26; B60K 2006/4825; B60K 6/48; B60K 6/387; B60K 6/547; B60K 2006/268
See application file for complete search history.

(56) References Cited

U.S. PATENT DOCUMENTS

| | | | |
|---|---|---|---|
| 2010/0298092 A1* | 11/2010 | Tsuchikawa | B60W 10/08 477/71 |
| 2012/0129650 A1* | 5/2012 | Lemp | B60W 10/08 477/5 |
| 2014/0136039 A1* | 5/2014 | Tanishima | B60L 15/2054 701/22 |
| 2014/0195082 A1* | 7/2014 | Takamura | B60L 15/2054 701/22 |
| 2015/0329105 A1 | 11/2015 | Matsui et al. | |

* cited by examiner

METHOD AND CONTROL UNIT FOR OPERATING A MOTOR VEHICLE DRIVE TRAIN

CROSS-REFERENCE TO RELATED APPLICATION

The present application is related and has right of priority to German Patent Application No. 10 2019 201 790.8 filed on Feb. 12, 2019, the entirety of which is incorporated by reference for all purposes.

FIELD OF THE INVENTION

The invention relates generally to a method for operating a drive train of a motor vehicle, and to a control unit suitable for operating a drive train of a motor vehicle.

BACKGROUND

Patent application DE 10 2004 002 061 A1 describes a method for the open-loop control and closed-loop control of a drive train of a hybrid vehicle. The drive train has an internal combustion engine and an electric machine, which are connectable to one another via a clutch unit. The internal combustion engine is startable by the electric machine. During this starting process, a shift element between the electric machine and an output shaft is adjusted such that a torque independent of the starting process is present at the output shaft.

Patent application DE 10 2010 061 826 A1 describes a method for accelerating this decoupling between the electric machine and the output shaft. Accordingly, in the presence of a decoupling demand, the electric machine is actuated such that it builds up a torque, for example, by outputting a specified rotational speed for the electric machine.

The problem addressed by the present invention is that of further developing this method.

SUMMARY OF THE INVENTION

The method is suitable for operating a motor vehicle drive train, which includes an internal combustion engine, an electric machine or motor, a separating clutch in the power flow between the internal combustion engine and the electric machine, and a transmission for providing different gears or gear speed ratios between an input shaft and an output shaft of the transmission. A rotor of the electric machine is connected to the input shaft directly or via a torque converter. A "direct connection" is understood to be a connection, which provides for a fixed speed ratio between the rotor and the input shaft. This fixed speed ratio can take place with a direct, rotationally fixed connection, or with an interconnected transmission having a constant ratio.

If the internal combustion engine is to be started, the separating clutch is transferred into an engaged condition or at least into a slip state starting from the disengaged condition, so that the electric machine can accelerate the internal combustion engine to a starting speed. During the starting process of the internal combustion engine, a torque-transmitting element between the electric machine and the output shaft is held in a slip state. The torque-transmitting element is, for example, a torque converter lockup clutch of a torque converter, a clutch between the electric machine and the input shaft of the transmission, or a shift element in the power flow of the transmission. As a result, vibrations arising during the starting process are decoupled from the output shaft, whereby the ride comfort of the motor vehicle is improved. In order to reliably reach and maintain the desired slip state of the torque-transmitting element during the starting process, the torque of the electric machine is increased.

According to the invention, in order to reliably reach and maintain the slip state of the torque-transmitting element between the electric machine and the output shaft, a decision is reached regarding which load direction the drive train will likely assume during the starting process. The two possible load directions are pull and push. The electric machine is operated either as a motor or as a generator, depending on the expected load direction, in order to reliably bring the torque-transmitting element into the slip state and to maintain the slip state.

Such an approach is advantageous, in particular, when the probability of a change in the load direction during the starting process of the internal combustion engine is high. This is the case, for example, when the present input torque demanded by the driver is close to zero. If the electric machine is operated as a motor in such a case, the input-side rotational speed of the torque-transmitting element increases in an appropriate manner. If a change in load direction from pull to push now takes place, the input-side rotational speed of the torque-transmitting element decreases again, briefly reaches a synchronous speed with respect to the output side of the torque-transmitting element, and, thereafter, decreases further. During the "crossing" of the synchronous speed, the torque-transmitting element changes from kinetic friction to static friction and, thereafter, back to kinetic friction. This transition is noticeable to occupants of the motor vehicle and has an adverse effect on comfort. This applies in the same way during an initial operation of the electric machine as a generator and a subsequent change of the load direction from push to pull.

Such a behavior is preventable, in many cases, by the approach according to the invention. By taking into account the load direction expected during the starting process and the appropriate operation of the electric motor as a motor or as a generator in order to reliably reach and maintain the slip state of the torque-transmitting element, the decoupling direction remains constant, provided the actual load direction during the starting process of the internal combustion engine corresponds to the expected load direction. A "crossing" of the synchronous speed is avoided in these cases.

Preferably, the electric machine is operated as a generator when the expected load direction is a pushing or coasting operation. The electric machine is therefore operated as a motor when the expected load direction is a pulling or traction operation.

In order to reliably bring the torque-transmitting element into the slip state, a pilot torque is preferably specified to or predetermined within a control unit of the electric machine. The sign of this pilot torque is therefore dependent on the expected load direction of the drive train during the starting process of the internal combustion engine.

According to one preferred embodiment, when there is a demand to start the internal combustion engine, the drive train is loaded in the expected load direction by the electric machine when the magnitude of a currently specified or desired input torque or the magnitude of a currently present or actual input torque at a given time is less than or equal to a limiting value. This is the case because, in particular, when the input torque is low, the probability of a change in load direction increases.

Preferably, the load direction expected during the starting process of the internal combustion engine is determined depending on the currently present input torque of the drive train. This is, for example, a computationally determined or calculated torque, which acts on the input shaft. The values necessary for such determination are present in a typical drive train control unit, such that a complex sensor unit is omitted. When the currently present input torque of the drive train is greater than or equal to zero, a pulling or traction operation is preferably expected as the load direction during the starting process. When the currently present input torque of the drive train is less than zero, a pushing or coasting operation is preferably expected as the load direction during the starting process.

Preferably, the load direction expected during the starting process of the internal combustion engine is determined depending on the currently present specified input torque. The specified input torque is determined, for example, based on the position of the accelerator pedal of the motor vehicle. Since the position of the accelerator pedal usually characterizes the drive demand of the driver, this dependence is particularly well suited for determining the expected load direction. Depending on the specific application, the position of the accelerator pedal is utilized either directly or in a filtered manner for determining the specified input torque. When the currently present specified input torque of the drive train is greater than or equal to zero, a pulling or traction operation is preferably expected as the load direction during the starting process. When the currently present specified input torque of the drive train is less than zero, a pushing or coasting operation is preferably expected as the load direction during the starting process.

Preferably, the expected load direction of the drive train during the starting process of the internal combustion engine is invariable for a predetermined time after being determined. As a result, a hysteretic behavior is achieved, so that a frequent change-over of the expected load direction is avoided.

Preferably, before the torque of the electric machine is increased, a contact force on the torque-transmitting element is reduced, in order to accelerate the establishment of a differential speed at the torque-transmitting element. Such an approach improves the comfort, since such increase of the torque is not noticeable, or is only negligibly noticeable, to the driver.

BRIEF DESCRIPTION OF THE DRAWINGS

Exemplary embodiments of the invention are described in detail in the following with reference to the attached figures. Wherein.

DETAILED DESCRIPTION

Figure 1:
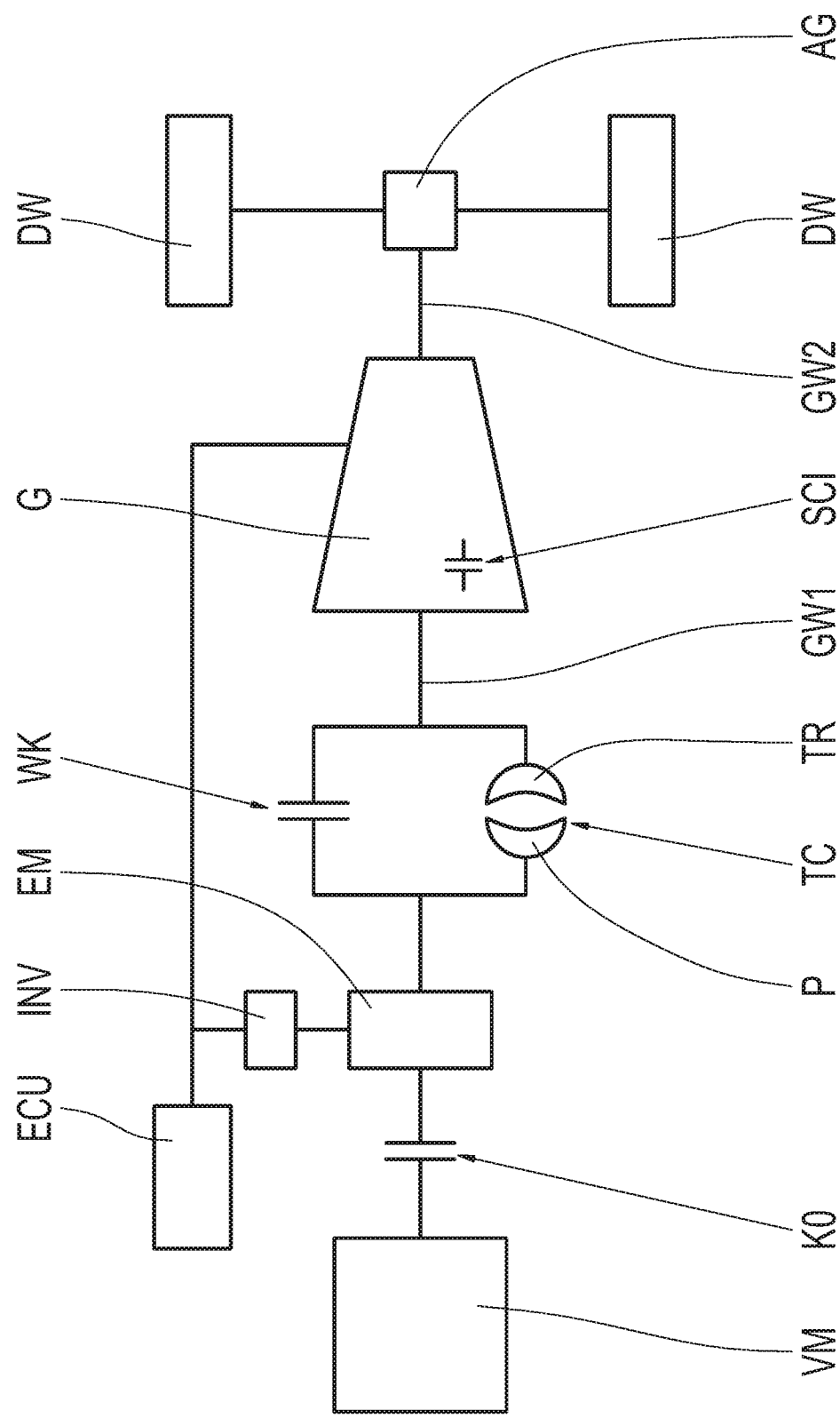
FIG. 1 shows a schematic view of one embodiment of a drive train for a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of one embodiment of a hybrid drive train for a motor vehicle. The hybrid drive train includes an internal combustion engine VM and an electric machine or motor EM. A separating clutch K0 is arranged between the internal combustion engine VM and the electric machine EM. Using the separating clutch K0, a power flow is connectable between the internal combustion engine VM and the electric machine EM. The hybrid drive train also has a transmission G including an input shaft GW1 and an output shaft GW2. The output shaft GW2 is connected to a differential gear AG, where the power present at the output shaft GW2 is distributed to driving wheels DW of the motor vehicle via the differential gear AG. A torque converter TC is arranged in the power flow between the electric machine EM and the input shaft GW1. The torque converter TC has an impeller P, which is connected to the electric machine EM, more precisely, to a rotor of the electric machine EM. A turbine wheel TR of the torque converter TC is connected to the input shaft GW1 of the transmission G. The impeller P and the turbine wheel TR cooperate hydrodynamically, so that power from the impeller P is hydrodynamically transmitted to the turbine wheel TR. The impeller P and the turbine wheel TR are mechanically connectable to one another by engaging a torque converter lockup clutch WK.

The transmission G is configured for implementing different gears or gear speed ratios between the input shaft GW1 and the output shaft GW2. Multiple shift elements are provided for implementing the gears. One shift element SCI of the multiple shift elements is represented in FIG. 1 for example. The shift elements, including the shift element SCI, cooperate with planetary gear sets (not represented in FIG. 1), in order to implement the different gears between the input shaft GW1 and the output shaft GW2. This is to be considered merely as an example. Instead of, or in addition to, the planetary gear sets, it is also possible to utilize spur gear stages and/or one or multiple toroidal drives, which cooperate with the shift elements, including the shift element SCI, in order to implement gears.

Moreover, an electronic control unit ECU is provided. The control unit ECU has a communication link to a power converter INV, which is associated with the electric machine EM for the open-loop control of the electric machine EM. The control unit ECU also has a communication link to the transmission G. The transmission G includes an actuator for actuating the shift element SCI. Moreover, the transmission G also has an actuator for actuating the torque converter lockup clutch WK and an actuator for actuating the separating clutch K0. This is also to be considered merely as an example. The separating clutch K0 could also be actuated by an actuator, which is independent of the transmission G. The same applies for the actuation of the torque converter lockup clutch WK.

The torque converter lockup clutch WK forms a torque-transmitting element between the electric machine EM and the output shaft GW2. If the torque converter lockup clutch WK enters a slip state, a starting process of the internal combustion engine VM is decoupled from the output shaft GW2 by the torque converter lockup clutch WK.

Figure 2:
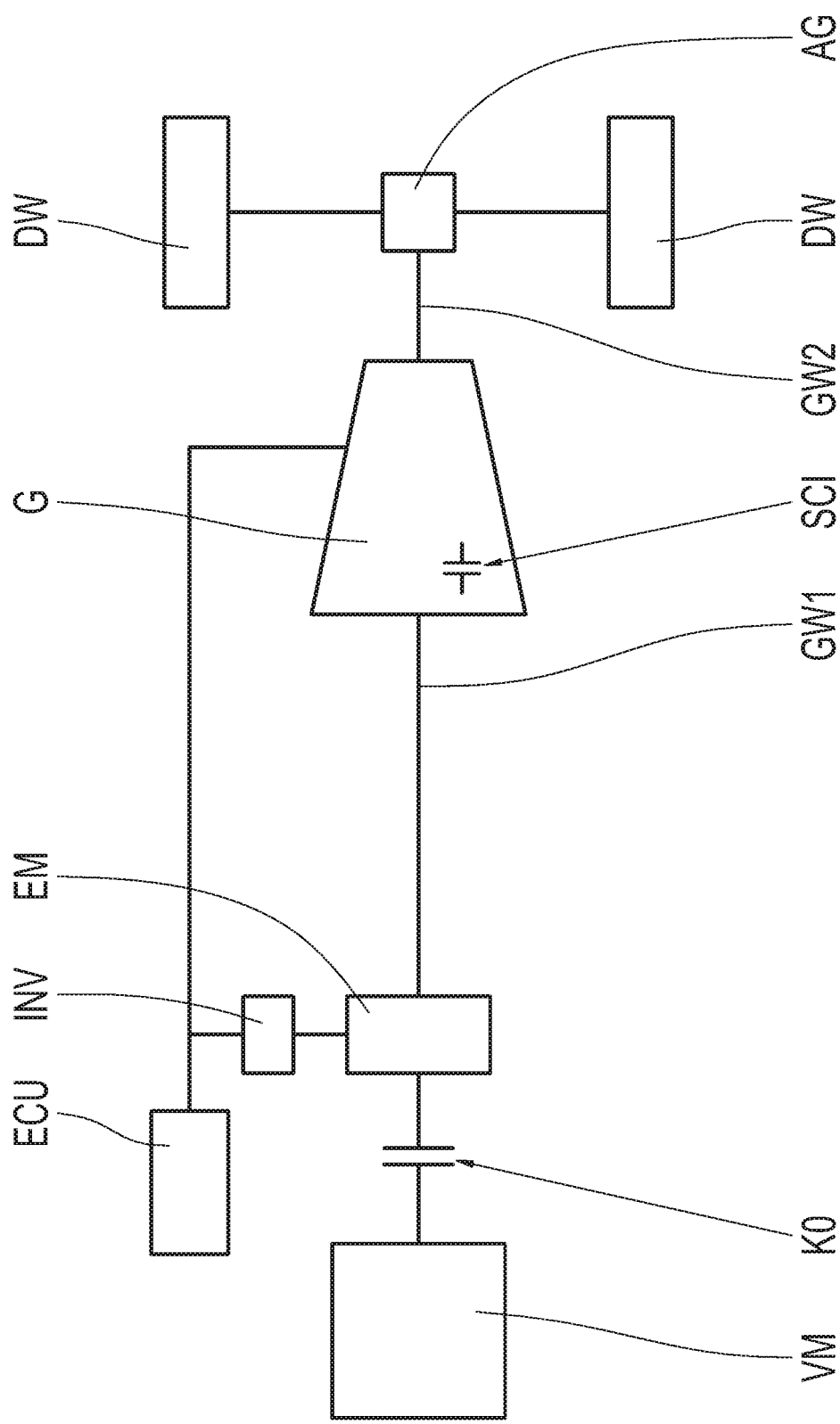
FIG. 2 shows a schematic view of another embodiment of a drive train for a motor vehicle.

FIG. 2 shows a schematic view of another embodiment of a hybrid drive train for a motor vehicle, which essentially corresponds to the drive train represented in FIG. 1, except that the torque converter is now omitted, so that the electric machine EM is directly connected to the input shaft GW1. If the shift element SCI contributes to the gear implementation in the transmission G, the shift element SCI forms a torque-transmitting element between the electric machine EM and the output shaft GW2. If the shift element SCI enters a slip state, a starting process of the internal combustion engine VM is decoupled from the output shaft GW2 by the shift element SCI.

Figure 3:
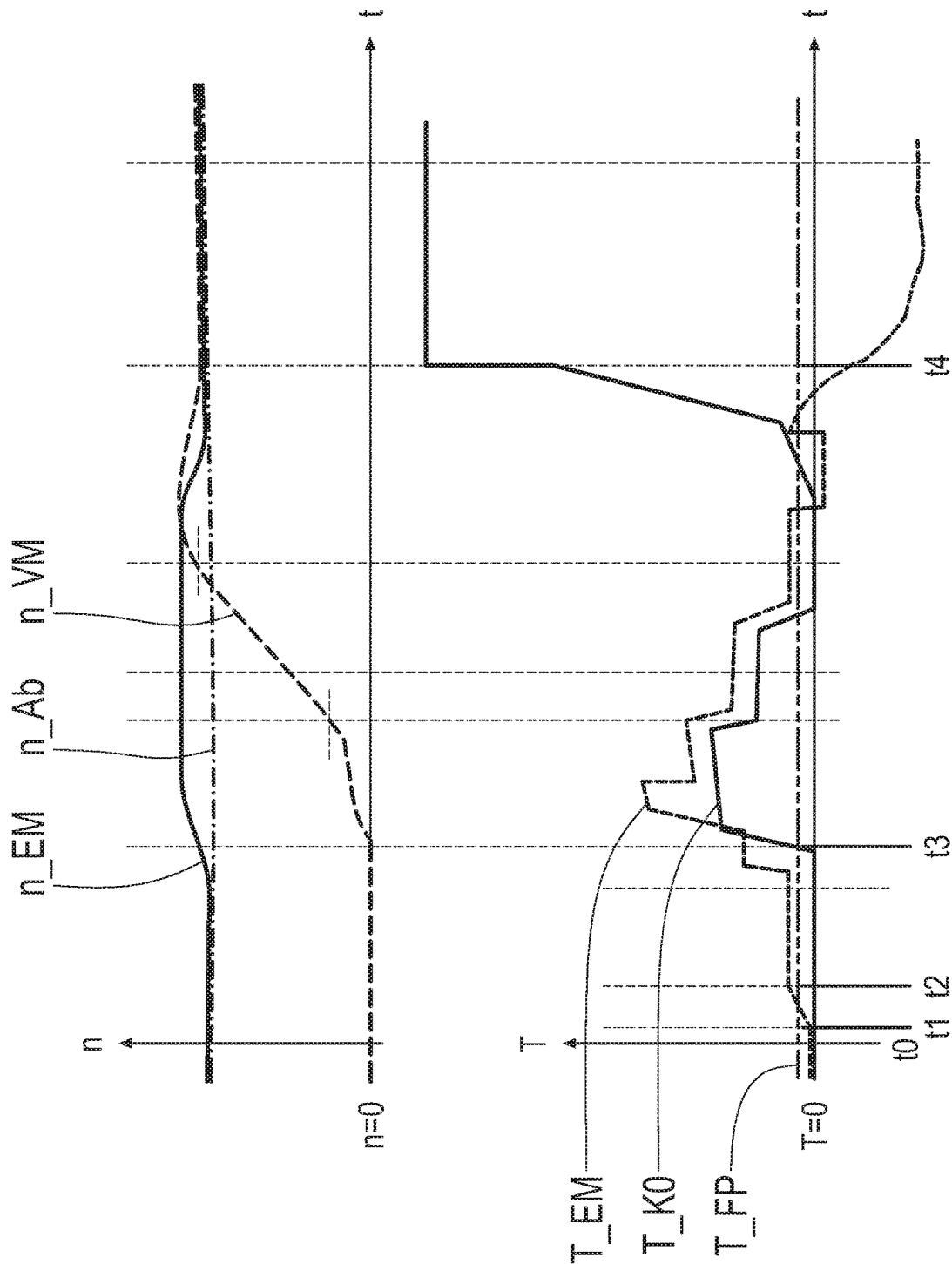
FIG. 3 shows a first embodiment of a time sequence for different variables of a drive train.

FIG. 3 shows the time profile of different variables of a drive train, such as the drive train according to FIG. 1 or FIG. 2, during a starting process of the internal combustion engine VM, including a speed n_EM of the electric machine EM, a speed n_Ab of an output side of the torque converter TC or of the shift element SCI, a speed n_VM of the internal combustion engine VM, a torque T_EM of the electric machine EM, a torque T_K0 transmitted by the separating clutch K0, and a specified input torque T_FP demanded by the driver of the motor vehicle.

The motor vehicle rolls at a point in time t0, without being driven by the electric machine EM. A gear is engaged in the transmission G, so that the input shaft GW1 and the electric machine EM coupled thereto assume a speed n_EM greater than zero. The internal combustion engine VM is at a standstill and is decoupled from the rest of the drive train by the disengaged separating clutch K0. The specified input torque T_FP demanded by the driver is slightly greater than zero. If the drive train includes the torque converter TC, its torque converter lockup clutch WK is engaged. A start of the internal combustion engine VM is demanded by an operating strategy of the motor vehicle, for example, due to a battery having a charge falling below a minimum state of charge, the battery supplying the electric machine EM with electrical energy. In this type of driving mode, the load direction of the drive train is changeable during the starting process of the internal combustion engine VM, for example, due to an acceleration or deceleration of the motor vehicle demanded by the driver.

The load direction expected during the starting process of the internal combustion engine VM is determined depending on the currently present input torque. The torque acting on the input shaft GW1 is utilized for this purpose. The torque acting on the input shaft GW1 corresponds, in the present condition, to the torque T_EM of the electric machine EM, since the internal combustion engine VM does not act on the input shaft GW1 due to the separating clutch K0 being disengaged. Since the torque of the electric machine EM is precisely zero, a pulling or traction operation is expected during the starting process of the internal combustion engine VM. Alternatively, the specified input torque T_FP demanded by the driver is usable for determining the load direction expected during the starting process. Since the specified input torque T_FP is greater than zero, a pulling or traction operation is expected during the starting process.

In order to bring the torque converter lockup clutch WK or the shift element SCI into the slip state starting from the engaged condition, a pilot torque is output to the electric machine EM at a point in time t1. Shortly before this takes place, a contact force on the torque converter lockup clutch WK or on the shift element SCI is reduced. In order to increase the torque of the electric machine EM, the electric machine EM is operated as a motor, so that the speed n_EM of the electric machine EM becomes greater than the output-side speed n_Ab of the torque converter lockup clutch WK or of the shift element SCI. The torque T_EM of the electric motor EM now increases in a ramp-like manner up to a point in time t2 and, thereafter, is held constant for a period. Between the point in time t2 and a point in time t3, the speed n_EM of the electric machine EM increases as compared to the output-side speed n_Ab of the torque converter lockup clutch WK or of the shift element SCI, so that a slip state of the torque converter lockup clutch WK or of the shift element SCI is present.

At the point in time t3, the separating clutch K0 is brought into a slip state, so that the internal combustion engine VM is accelerated to a starting speed. The point in time t3 therefore marks the beginning of the starting process of the internal combustion engine VM. In the process, the torque T_EM of the electric machine EM is substantially increased, in order to overcome the drag torque of the internal combustion engine VM. At a point in time t4, the separating clutch K0 is completely engaged, so that the speed n_VM of the internal combustion engine VM is equal to the speed n_EM of the electric machine EM. Prior thereto, the torque converter lockup clutch WK or the shift element SCI is transferred from the slip state into the engaged condition again.

Figure 4:
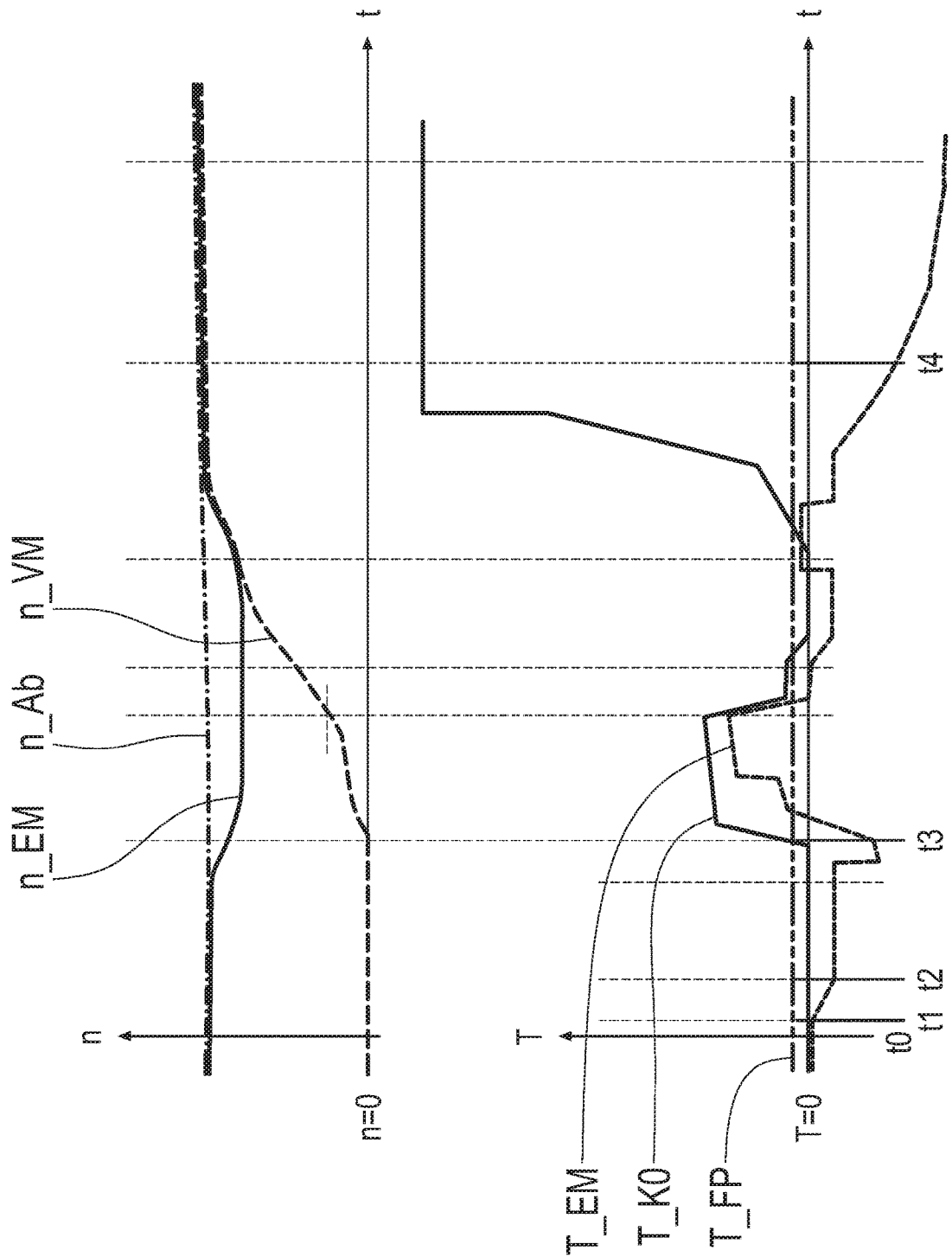
FIG. 4 shows another embodiment of a time sequence for different variables of a drive train.

FIG. 4 also shows the time profile of different variables of the drive train during a starting process of the internal combustion engine VM. In contrast to FIG. 3, the currently present input torque of the drive train, the torque T_EM of the electric machine EM in this instance, at the point in time t1 is slightly less than zero. In other words, a small amount of recuperative torque is present at the point in time t1. For this reason, a pushing or coasting operation of the drive train is expected for the subsequent internal combustion engine start. Therefore, the recuperative power of the electric machine EM is increased, until it reaches a defined value at the point in time t2. The increase of the recuperative power is achieved by specifying a negative pilot torque T_EM of the electric machine EM. Between the point in time t2 and a point in time t3, the speed EM_n of the electric machine EM therefore decreases as compared to the speed n_Ab of the torque converter lockup clutch WK or of the shift element SCI, so that a slip state of the torque converter lockup clutch WK or of the shift element SCI is present.

At the point in time t3, the separating clutch K0 is brought into a slip state, so that the internal combustion engine VM is accelerated to a starting speed. The point in time t3 therefore marks the beginning of the starting process of the internal combustion engine VM. In the process, the torque T_EM of the electric machine EM is substantially increased, in order to overcome the drag torque of the internal combustion engine VM.

At a point in time t4, the separating clutch K0 is completely engaged, so that the speed n_VM of the internal combustion engine VM is equal to the speed n_EM of the electric machine EM.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

VM internal combustion engine
G transmission

GW1 input shaft
GW2 output shaft
n_VM speed of the internal combustion engine
K0 separating clutch
T_K0 torque transmitted by the separating clutch
EM electric machine
n_EM speed of the electric machine
T_EM torque of the electric machine
TC torque converter
P impeller
TR turbine wheel
WK torque converter lockup clutch
SCI shift element
n_Ab output-side speed of the torque converter lockup clutch or of the shift element
T_FP specified input torque
AG differential gear
DW driving wheel
ECU control unit
INV power converter

The invention claimed is:

1. A method for operating a drive train of a motor vehicle, the drive train comprising an internal combustion engine (VM), an electric machine (EM), a transmission (G) for providing different gears between an input shaft (GW1) and an output shaft (GW2) of the transmission (G), and a separating clutch (K0) in power flow between the internal combustion engine (VM) and the electric machine (EM), wherein the electric machine (EM) is connected to the input shaft (GW1) directly or via a torque converter (TC), the method comprising, for a starting process of the internal combustion engine (VM):
   transferring the separating clutch (K0) from a disengaged condition into an engaged condition or into a slip state such that the electric machine (EM) accelerates the internal combustion engine (VM) to a starting speed;
   actuating a torque-transmitting element (SCI, WK) between the electric machine (EM) and the output shaft (GW2) such that the torque-transmitting element (SCI, WK) enters a slip state;
   increasing the torque (T_EM) of the electric machine (EM) to reliably reach and hold the slip state of the torque-transmitting element (SCI, WK); and
   operating the electric machine (EM) as a generator or as a motor depending on an expected load direction of the drive train during the starting process to reliably reach and hold the torque-transmitting element (SCI, WK) in the slip state.

2. The method of claim 1, wherein the electric machine (EM) is operated as a generator when the expected load direction is a coasting operation, and
   wherein the electric machine (EM) is operated as a motor when the expected load direction is a traction operation.

3. The method of claim 1, further comprising specifying a pilot torque to a control unit of the electric machine (EM) to reliably bring the torque-transmitting element (SCI, WK) into the slip state.

4. The method of claim 1, further comprising, when there is a demand to start the internal combustion engine (VM), loading the drive train in the expected load direction using the electric machine (EM) when a magnitude of a currently specified input torque or a magnitude of a currently present input torque input torque is less than or equal to a limiting value.

5. The method of claim 4, wherein the expected load direction of the drive train during the starting process depends on the currently present input torque of the drive train.

6. The method of claim 5, wherein the currently present input torque of the drive train is a computationally determined torque, the currently present input torque acting on the input shaft (GW1).

7. The method of claim 5, wherein the expected load direction of the drive train is a traction operation when the currently present input torque is greater than or equal to zero, and wherein the expected load direction of the drive train is a coasting operation when the currently present input torque is less than zero.

8. The method of claim 4, wherein the expected load direction of the drive train during the starting process depends on the currently present specified input torque.

9. The method of claim 8, wherein the currently present specified input torque is determined based on a position of an accelerator pedal of the motor vehicle.

10. The method of claim 8, wherein the expected load direction of the drive train is a traction operation when the currently present specified input torque is greater than or equal to zero, and wherein the expected load direction of the drive train is a coasting operation when the currently present specified input torque is less than zero.

11. The method of claim 1, wherein the expected load direction of the drive train during the starting process is invariable for a predetermined time after being determined.

12. The method of claim 1, further comprising reducing a contact force on the torque-transmitting element (SCI, WK) to accelerate the establishment of a differential speed at the torque-transmitting element (SCI, WK) before increasing the torque (T_EM) of the electric machine (EM).

13. A control unit (ECU) for the open-loop control of a drive train of a motor vehicle, the drive train comprising an internal combustion engine (VM), an electric machine (EM), a transmission (G) for providing different gears between an input shaft (GW1) and an output shaft (GW2) of the transmission (G), and a separating clutch (K0) in power flow between the internal combustion engine (VM) and the electric machine (EM), wherein the electric machine (EM) is connected to the input shaft (GW1) directly or via a torque converter (TC), wherein, for a starting process of the internal combustion engine (VM), the control unit (ECU) is configured to:
   transfer the separating clutch (K0) from a disengaged condition into an engaged condition or into a slip state so that the electric machine (EM) accelerates the internal combustion engine (VM) to a starting speed;
   actuate a torque-transmitting element (SCI, WK) between the electric machine (EM) and the output shaft (GW2) such that the torque-transmitting element (SCI, WK) enters a slip state;
   increase the torque of the electric machine (EM) to reach and hold the torque-transmitting element (SCI, WK) in the slip state; and
   operate the electric machine (EM) as a generator or as a motor based at least in part on an expected load direction of the drive train during the starting process to bring the torque-transmitting element (SCI, WK) into the slip state.

14. A control unit (ECU) for the open-loop control of functions of a drive train of a motor vehicle, the control unit (ECU) being configured to carry out the method of claim 1.

* * * * *